Figure 1:
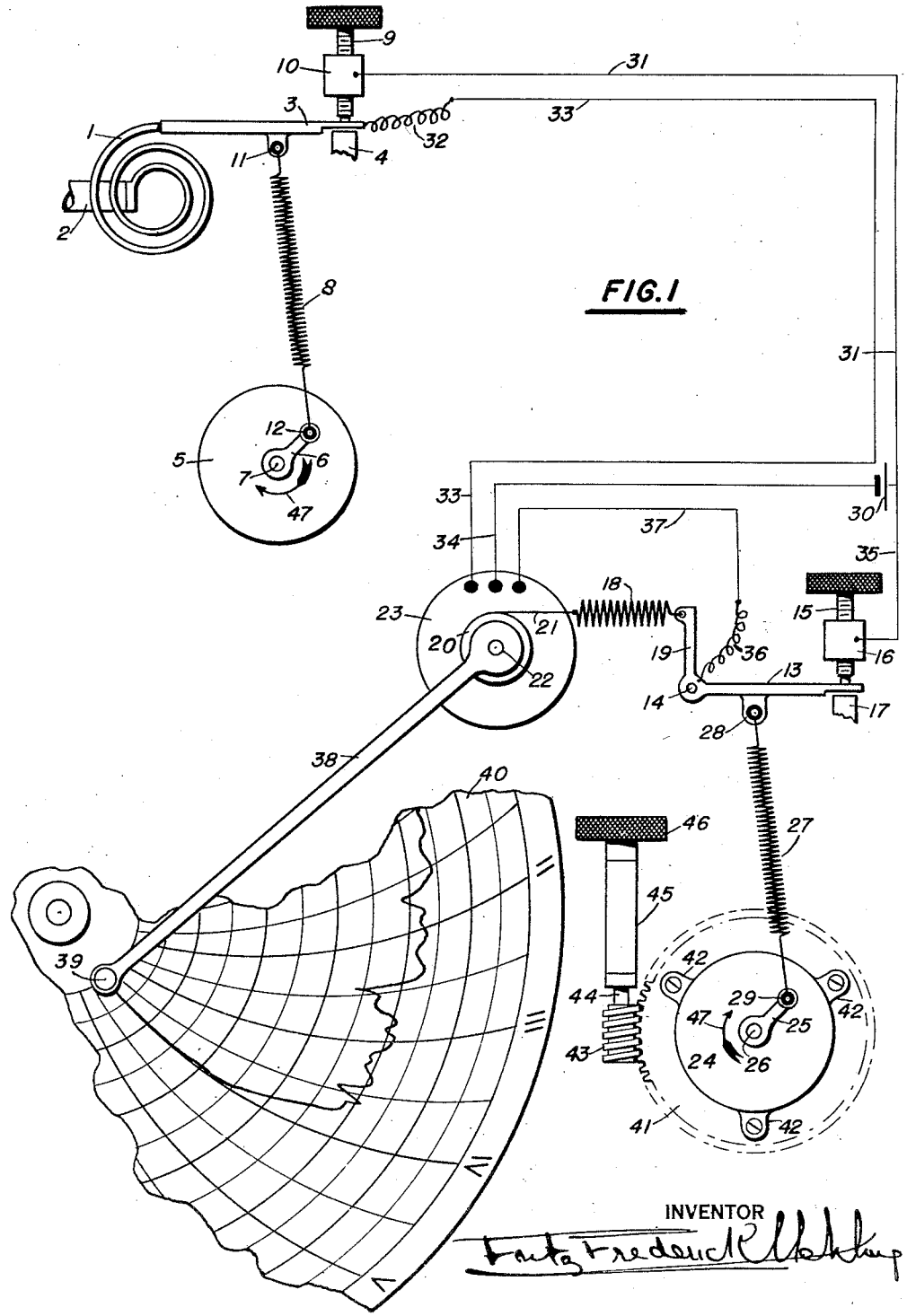

Nov. 15, 1938.　　　　F. F. UEHLING　　　　2,136,809
PRESSURE MEASURING MEANS
Filed Oct. 29, 1935　　　　3 Sheets-Sheet 1

INVENTOR

Nov. 15, 1938.    F. F. UEHLING    2,136,809
PRESSURE MEASURING MEANS
Filed Oct. 29, 1935    3 Sheets-Sheet 2

INVENTOR
Fritz Frederick Uehling

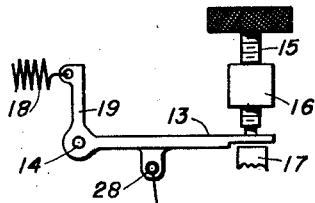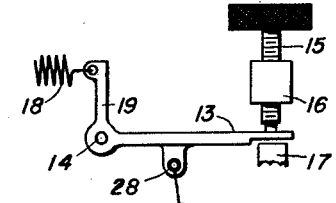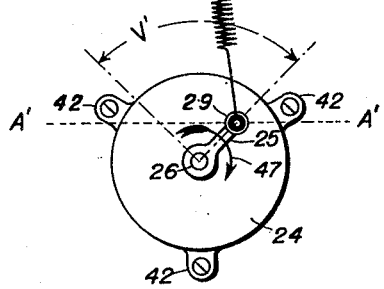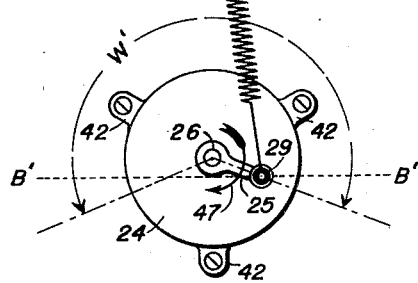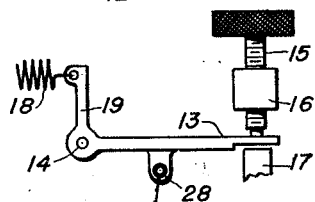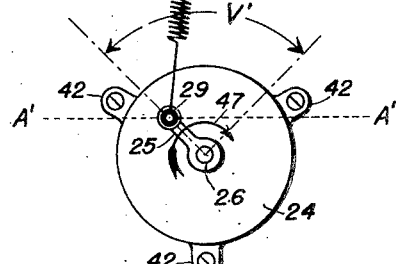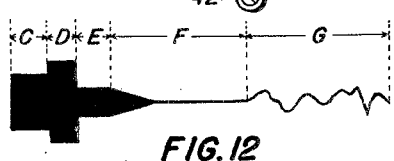

Patented Nov. 15, 1938

2,136,809

UNITED STATES PATENT OFFICE 2,136,809

PRESSURE MEASURING MEANS

Fritz Frederick Uehling, Passaic, N. J.

Application October 29, 1935, Serial No. 47,290

9 Claims. (Cl. 177—351)

This invention relates to a novel pressure measuring means which is adaptable for use as a telemetering system, consisting of means for conveying the effect of a variable force from one point to another, said force being primarily applied at the transmitter of the system, and measured or recorded by a receiver, said receiver being located at any distance from the transmitter.

More particularly the invention consists of two electric switches, the first of said switches being located at the transmitter and the second at the receiver, the purpose of each of said switches being to open or close an independent circuit. An indicating needle or marker is actuated in one direction or the other by an electrical means depending upon whether one or the other of said independent circuits is closed. Each of said switches is so designed that if two forces are applied to the switch in opposite directions, it will open or close depending upon whether the resultant force is positive or negative. The force which is to be recorded at the receiver is applied to the first switch at the transmitter in a positive direction while an opposing force which is continuously varied in regular cycles between definitely high and low limits by means of a continuously operating constant speed motor is applied to said switch in the opposite direction. The circuit which controls the motion of the indicating needle or marker in one direction will thus be closed during that period of each cycle in which the resultant of said forces is positive. Similarly a force is applied in a positive direction to the second switch at the receiver, the magnitude of which force is increased or decreased by the same electrical means which changes the position of the marker. A force is also applied to the second switch in the opposite direction, said opposing force being also continuously varied in regular cycles between definitely high and low limits by a second continuously operating constant speed motor. The circuit which controls the motion of the indicating needle or marker in the opposite direction will thus be closed during that period of each of said cycles in which the resultant of said forces is positive. The ratio of the period of time during which the switch at the transmitter is closed, to the period of time during which the switch at the receiver is closed is thus affected by any change in the magnitude of the measured force. The novel manner in which the variations in said ratio is utilized to graphically record variations in the magnitude of the measured force is described in detail in the following specifications:

Figure 1 illustrates diagrammatically, both the transmitter and the receiver of the system with the necessary electrical connections, and includes all of the essential elements of the invention; Figures 2, 3, 4, 5, 6 and 7 show the constant speed motor of the transmitter with a continuously revolving crank driven by said motor, in six different positions; Figures 8, 9, 10 and 11 show the constant speed motor of the receiver with a similar continuously revolving crank in four different positions; Figure 12 illustrates a record drawn by the marker of the receiver when the crank of the transmitter and the crank of the receiver are not synchronized with respect to their relative angular positions; the same numerals or symbols refer to the same parts or conditions throughout all of the illustrations.

For the purpose of illustration, the static pressure of a fluid has been chosen as the variable pressure to be measured, said pressure communicating with a Bourdon spring 1 through a chamber 2, which chamber is located in a fixed position as illustrated. The open end of the Bourdon spring is connected with the chamber 2, while the closed end of the Bourdon spring is provided with an extension arm 3. The Bourdon spring is so positioned that, when the pressure in 2 increases, it will expand to move the arm 3 counter-clockwise, and when the pressure in 2 decreases, it will contract to move the arm 3 clockwise. The motion of the arm 3 which would normally be caused by a change of pressure in 2, is however restricted in one direction by a fixed stop 4, and in the other direction by an adjustable contact screw 9, the purpose of which screw is to make contact with the arm 3 to close an electric circuit when the arm touches the screw. The electric circuit which is thus closed by contact between 3 and 9 will be presently described. The contact screw 9 is held by a threaded support 10 located in a fixed position, as illustrated, said screw being adjusted with respect to the stop 4 and the arm 3 so that only a very slight motion of the arm is permitted in either direction, and so that, when the pressure in chamber 2 is zero, the arm 3 will rest against the contact screw with a slight pressure as caused by the Bourdon spring 1 when the arm 3 is forced downward by the screw 9 to its finally adjusted position as shown in Figure 1.

A continuously operating constant speed motor 5 is provided with a crank 6, which crank is fastened to the driving shaft 7 of the motor, said shaft turning in a clockwise direction as illustrated by the arrow 47. The crank 6 is connected with the arm 3 through a spring 8, as illustrated, so that the force which the spring exerts on the arm 3 depends upon the angular position of the crank. The spring 8 is fastened to a bearing 11 on the arm 3, and to a bearing 12 on the crank 6 in any conventional manner so that, as the crank continues to revolve, the axis of the spring will always be in a plane at right angles to the shaft 7, the motor 5 being located in a definitely fixed horizontal position so that the axis of its driving shaft 7 and the bearing 11 are both in the same vertical plane. As the shaft 7 continues to rotate, the force exerted on the arm 3 by the spring 8 will obviously increase and decrease consecutively between definitely fixed high and low magnitudes which extreme magnitudes occur respectively when the crank 6 is at its lowest and highest position with respect to the arm. The variable force which is thus created by the spring 8 tends to pull the arm 3 away from the contact screw 9, while the force exerted on the arm by the Bourdon spring 1 tends to hold the arm 3 against the contact screw. It therefore follows that when the force exerted on the arm by the Bourdon spring 1 is greater than the force exerted on the arm by the spring 8, electric contact between the arm 3 and the contact screw 9 will be established, and when the force exerted on the arm by the spring 8 is greater than the force exerted on the arm by the Bourdon spring 1, electric contact between the arm 3 and the contact screw 9, will be broken. In other words, as the crank 6 continues to revolve, the arm 3 will be forced against the contact screw 9 when the resultant force acting on the arm is positive, and against the stop 4 when said resultant force is negative.

Figure 2:
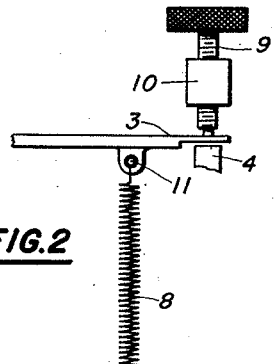
Figure 3:
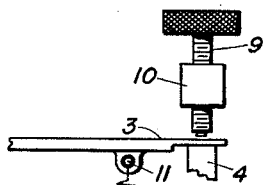

As previously stated, the adjusted position of the contact screw 9 is such that the arm 3 is forced against the contact screw by the Bourdon spring when the pressure in chamber 2 is zero. The smallest force which the spring 8 exerts on the arm 3 obviously occurs when the crank 6 is in its highest position as illustrated in Figure 2. Spring 8 is so designed that, in the one extreme position as illustrated in Figure 2, and with zero pressure in chamber 2, the force which it exerts on the arm 3 is not sufficient to overcome the pressure with which the Bourdon spring forces the arm 3 against the contact screw. In other words, in the extreme position illustrated in Figure 2, the resultant of the force exerted on the arm by the Bourdon spring and the force exerted on the arm by spring 8 is positive and therefore keeps the arm 3 in contact with the screw 9. The force which the spring 8 exerts on the arm 3 obviously increases as the crank 6 revolves in a clockwise direction from the position illustrated in Figure 2, and continues to increase until the crank is in its extreme low position as illustrated in Figure 3. Similarly as the crank continues to rotate in a clockwise direction from the position illustrated in Figure 3, the pressure which the spring 8 exerts on the arm 3 decreases and continues to decrease until the crank is again in its extreme high position as illustrated in Figure 2. The initial tension of the Bourdon spring (when the pressure in chamber 2 is zero) is such that the force which it exerts on the arm 3 is sufficient to keep the arm against the contact screw 9, against the opposing force of spring 8 so long as the bearing 12 is above the line A—A, Figures 4 and 5. In other words when the pressure in chamber 2 is zero, the pressure which the Bourdon spring 1 exerts on the arm 3 is sufficient to keep the arm in contact with the screw 9 against the opposing force of spring 8 during that period of time in which the crank 6 revolves from the position illustrated in Figure 5 to the position illustrated in Figure 4. The spring 8 is however so designed that, when the position of the crank is below the line A—A, its tension will have caused an opposing force of sufficient magnitude to pull the arm 3 away from the contact screw 9 and against the stop 4, thus overcoming the force of the Bourdon spring when the pressure in chamber 2 is zero. It follows therefore that as the crank 6 continues to revolve in a clockwise direction, and so long as there is no pressure in the chamber 2, contact will be established between the arm 3 and the screw 9 during each period of time in which the crank 6 moves from the position illustrated in Figure 5 to the position illustrated in Figure 4, and that contact between the arm 3 and the contact screw 9 will be broken during each period of time in which the crank moves in a clockwise direction from the position illustrated in Figure 4 to the position illustrated in Figure 5. In other words when the pressure in chamber 2 is zero and as the crank 6 continues to revolve at a constant velocity, there is a definite period of time per revolution of crank 6 during which electric contact is established between the arm 3 and the screw 9, said period being represented by angle V, Figures 4 and 5.

Let us now assume that the pressure of the medium in chamber 2 has increased to some definite magnitude. This will immediately cause the Bourdon spring 1 to hold the arm 3 against the screw 9 with a greater force, and consequently the crank 6 will have to turn through a greater angle before the opposing force of the spring 8 is large enough to overcome said greater force of the Bourdon spring. It therefore follows that the crank 6 will have to turn to some new position, Figure 6, before the spring 8 will have sufficient power to pull the arm 3 away from the screw 9 and against the stop 4. As the crank continues to revolve, the force exerted on the arm by spring 8 will continue to increase until crank 6 reaches its lowest position, and as the crank continues to turn, the force exerted on the arm by the spring 8 will again decrease until the crank reaches the position illustrated in Figure 7, after which the force exerted on the arm by the Bourdon spring will again be greater than the force exerted on the arm by the spring 8 and the arm will again be forced against the screw 9. It is obvious, under the new conditions above stated, that contact will be established between the arm 3 and the contact screw 9 so long as the bearing 12 is above the line B—B, Figures 6 and 7, and that contact between the arm 3 and the contact screw 9 will be broken so long as said bearing is below said line. In other words when the Bourdon spring is acted upon by said assumed higher pressure in the chamber 2, contact will be established between the arm 3 and the screw 9 during each period of time in which the crank moves in a clockwise direction from the position illustrated in Figure 7, to the position illustrated in Figure 6, and contact between the arm and the screw 9 will be broken during each period of time in which the crank continues to move in a clockwise direction from the position illustrated in Figure 6, to the position illustrated in Figure 7. The angle W, Figures 6 and 7, thus represents the period of time during each revolution of crank 6, in which contact is established between 3 and 9 under the assumed higher pressure in chamber 2. It will therefore be noted that an increased pressure in chamber 2 will increase the period of time per revolution of crank 6 during which contact is established between the arm 3 and the screw 9. Similarly, of course, as the pressure in chamber 2 decreases said period of time, per revolution of crank 6, during which contact between 3 and 9 is established will decrease. It therefore follows that the period of time in which the arm 3 contacts the screw 9, during each revolution of crank 6, increases or decreases in proportion to any increase or decrease of pressure in chamber 2. The above described elements constitute the essential parts of the transmitter and will be presently referred to in further detail.

An arm 13, Figure 1, similar to arm 3, is provided at the receiver or receiving end of the system, said arm being supported by a bearing 14 which bearing is held in a fixed position by any suitable means not shown. The motion of arm 13 is restricted in one direction by a fixed stop 17, and in the opposite direction by an adjustable contact screw 15, the purpose of which screw is to make contact with the arm 13 to close an electric circuit when the arm touches the screw. The electric circuit which is thus closed by contact between 13 and 15 will be presently described. The contact screw 15 is held by a threaded support 16 located in a fixed position as illustrated, said screw being so adjusted with respect to the stop 17 that only a very slight motion of the arm 13 is permitted in either direction. The arm 13 is normally held against the screw 15 by means of a spring 18. One end of the spring 18 is fastened to the arm 13 through an extension 19 as illustrated, which extension is an integral part of the arm. The other end of the spring 18 is fastened to a hub 20 by means of a flexible wire or ribbon 21, said hub 20 being fastened to the shaft 22 of a reversible motor 23. By any suitable means, not shown, the motor 23 is held in a fixed position as illustrated, so that the tension of the spring 18 may be increased or decreased depending upon whether the motor is energized to operate in one direction or the other.

A continuously operating constant speed motor 24, similar to motor 5, as previously described in connection with the transmitter, is also provided for the receiver, said motor 24 operating at exactly the same speed and in the same direction as motor 5 of the transmitter, and held in a fixed position by an adjustable means which will be presently described. A crank 25 which is fastened to the driving shaft 26 of the motor is connected with the arm 13 through a spring 27 so that the force which the spring exerts on the arm 13 depends upon the angular position of the crank. The spring 27 is fastened to the arm 13 and the crank 25 by means of bearings 28 and 29 respectively, so that its relation to the arm 13 and the crank 25 is identical to that described in connection with the spring 8 of the transmitter. In other words, the motor 24 operates continuously at exactly the same speed and in the same direction as motor 5, as indicated by arrow 47, and is located in the same relative position with respect to bearing 28 as the motor 5 is located with respect to bearing 11. Furthermore the cranks 6 and 25 are so fastened to their respective motor shafts that said cranks will always be parallel as the constant speed motors 5 and 24 continue to operate. As the crank 25 revolves from its extreme high position to its extreme low position and then back to its high position, the tension of the spring 27 will obviously increase and decrease consecutively between definitely fixed high and low magnitudes. The variable force which is thus created by the spring 27 tends to pull the arm 13 away from the contact screw 15, while the force exerted on the arm by the spring 18 tends to hold the arm against the contact screw. It therefore follows that when the force exerted on the arm by the spring 18 is greater than the force exerted on the arm by the spring 27, electric contact between the arm 13 and the screw 15 will be established, and when the force exerted on the arm by the spring 27 is greater than the force exerted on the arm by the spring 18, electric contact between the arm 13 and the screw 15 will be broken. In other words when the resultant force acting on the arm is positive, the arm will be forced against the contact screw 15, and when said resultant force is negative, the arm will be forced against the stop 17.

The circuit which energizes the motor 23 in a counter-clockwise direction to increase the tension of spring 18, in the manner previously stated, is closed by contact between the arm 3 and the contact screw 9 of the transmitter. This circuit starts at battery 30, thence through wire 31 to the contact screw 9, from the contact screw 9 to the arm 3, thence through a flexible connection 32 and wire 33 to the motor, and from the motor through wire 34 back to the battery. Similarly, the circuit which energizes said motor to decrease the tension of spring 18, in the manner already stated, is closed by contact between the arm 13 and the contact screw 15 of the receiver. Said circuit starts at battery 30, thence through wire 35 to the contact screw 15, from the contact screw through arm 13, flexible connection 36 and wire 37 to the motor and thence through wire 34 back to the battery. It thus follows that when contact is simultaneously established between arm 3 and its contact screw 9, and between the arm 13 and its contact screw 15, the motor 23 will be energized in both directions. In this electrically opposed condition the motor will not operate. If, however, contact between the arm 13 and its contact screw 15 be broken while contact between the arm 3 and its contact screw 9 is still established, then the motor 23 will be energized in the proper direction to increase the tension of the spring 18, and similarly, if contact between the arm 3 and its contact screw 9 be broken while contact between the arm 13 and its contact screw 15 is still established, then the motor 23 will be energized in the opposite direction to decrease the tension of the spring 18. The relative duration of the periods of time in which said motor is energized in one direction and in which it is energized in the opposite direction will be presently referred to in further detail.

Figure 4:
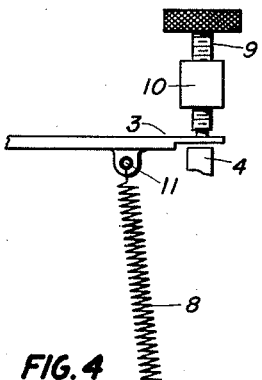
Figure 5:
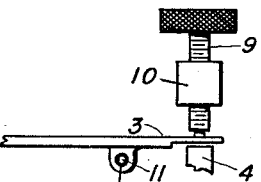
Figure 7:
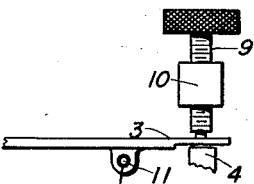

As previously stated, the spring 8 of the transmitter is adjusted with respect to the Bourdon spring 1 so that when there is no pressure in chamber 2, electric contact will be established between the arm 3 and the screw 9 during that period of time in which the crank 6 revolves from the position illustrated in Figure 5 to the position illustrated in Figure 4, and said contact broken during that period of time in which the crank 6 revolves from the position illustrated in Figure 4 to the position illustrated in Figure 5. It is obvious however that the length of the spring 18 of the receiver may be so chosen or adjusted with respect to spring 27 so that the time during which contact is established between the arm 13 and the contact screw 15 and the time during which contact between said arm and screw is broken, are respectively identical to the contact established period and the contact broken period of the arm 3 and contact screw 9 when the pressure in chamber 2 is zero. Let us assume that this preliminary adjustment has been made in which case contact between arm 3 and screw 9 of the transmitter, and contact between arm 13 and screw 15 of the receiver will be simultaneously established when cranks 6 and 25 reach the positions illustrated in Figures 5 and 9 respectively. Similarly contact between the arm 3 and screw 9 of the transmitter, and contact between arm 13 and screw 15 of the receiver will be simultaneously broken after cranks 6 and 25 pass the position illustrated in Figures 4 and 8 respectively. Therefore, if, as already stated, the cranks 6 and 25 revolve at the same rate of speed and are also synchronized with respect to position so that the two cranks are always parallel, then during each revolution of said cranks, the reversible motor 23 will be simultaneously energized to increase the tension of spring 18 and energized in the opposite direction to decrease the tension of spring 18, while said cranks revolve through the angles V and V' respectively, Figures 4 and 8. The motor 23 will obviously not operate while it is thus electrically opposed, and for this reason after the springs have been initially adjusted as above described, the motors 5 and 25 will operate continuously without affecting the tension of spring 18 so long as the pressure in chamber 2 remains zero. Obviously however, and in the manner already stated, any increase in the pressure which the Bourdon spring 1 exerts on the arm 3, will increase the angle through which the crank 6 travels before contact is broken between said arm and the contact screw 9. Therefore immediately after the pressure in chamber 2 begins to increase, the time during which the circuit is closed through 9 for energizing the motor 23 to increase the tension of spring 18, will be longer than the time during which the circuit is closed through screw 15 for energizing the motor 23 to decrease the tension of spring 18. Since the motor 23 is thus energized for a longer period in the proper direction to increase the tension of spring 18 than it is in the opposite direction to decrease the tension of said spring, it becomes obvious that as the pressure in chamber 2 increases, the tension of spring 18 will be increased during each revolution of the cranks 6 and 25 until the force which said spring 18 exerts on arm 13 is sufficient to maintain contact between the arm 13 and the screw 15, against the opposing variable force of spring 27, for the same period in which the Bourdon spring 1 maintains contact between the arm 3 and the screw 9 against the opposing variable force of spring 8.

Figure 6:
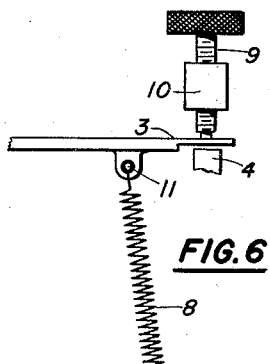

As a concrete example let us assume that the pressure in chamber 2 has instantaneously increased to a point where the force which the Bourdon spring 1 exerts on the arm 3 is sufficient to require the crank 6 to revolve to the position illustrated in Figure 6 before the tension of spring 8 is sufficient to pull the arm 3 away from the contact screw 9 and against the stop 4. Therefore under the assumed higher pressure in chamber 2, the force resulting from the combined action of springs 1 and 8 will hold the arm 3 against the contact screw 9 so long as the bearing 12 is above the line B—B, Figures 6 and 7, and so long as said bearing is below said line B—B the force resulting from the combined action of said springs will hold the arm 3 away from the contact screw 9 and against the stop 4. It is obvious therefore that the assumed higher pressure in chamber 2 will have increased the period during which contact is established between 3 and 9 from that represented by angle V, Figures 4 and 5, to that represented by angle W, Figures 6 and 7. However, at the instant in which the pressure in chamber 2 increased to said assumed higher pressure, the circuit through 15 for energizing the motor 23 in a clockwise direction to decrease the tension of spring 18, will still be closed during the shorter period, represented by angle V', Figures 8 and 9, during each revolution of receiver crank 25. Under these conditions the motor 23 will obviously increase the tension of spring 18 while the crank 6 of the transmitter moves from the position illustrated in Figure 7 to the position illustrated in Figure 5. As the crank 6 continues to move from the position illustrated in Figure 5 to the position illustrated in Figure 4, the motor 23 will be energized in both directions and in this electrically opposed condition the tension of the spring 18 will remain unchanged during the period represented by angles V and V', Figures 4 and 8. Then as the crank 6 continues to revolve, the motor 23 will again increase the tension of spring 18 while the crank 6 moves from the position illustrated in Figure 4 to the position illustrated in Figure 6. Thus when the pressure in chamber 2 changes from zero to said assumed higher pressure, the tension of spring 18 will be increased twice during each revolution of cranks 6 and 25 until the force which said spring exerts on arm 13 to establish contact between 13 and 15 is sufficient to maintain said contact during the period of time represented by angle W" said angle W', Figures 10 and 11, being equal to the angle W of Figures 6 and 7. It therefore follows that when the pressure in chamber 2 increases thus increasing the contact period between 3 and 9, the motor 23 will increase the tension of spring 18 until the contact period between 13 and 15 is the same as the contact period between 3 and 9 under which conditions, for reasons already stated, the motor 23 will be unable to function and therefore no further change in the tension of spring 18 can take place.

Similarly, if the pressure in chamber 2 changes instantaneously from the assumed higher pressure back to zero pressure, the force which the Bourdon spring exerts on the arm 3 will simultaneously decrease until the force exerted on the arm by spring 8 is again sufficient to break contact with the screw 9 when the crank 6 of the transmitter reaches the position illustrated in Figure 4, in which case the circuit through 9 for energizing the motor 23 in a counter-clockwise direction to increase the tension of spring 18 will again be closed during that period represented by angle V, Figures 4 and 5. The zero pressure in chamber 2 will thus have decreased the period during which contact is established between 3 and 9 from that represented by angle W, Figures 6 and 7, to that represented by angle V, Figures 4 and 5. However at the instant in which the pressure in chamber 2 decreased from the assumed higher pressure back to zero, the circuit through 15 for energizing the motor 23 in a clockwise direction to decrease the tension of spring 18, will still be closed during the longer period represented by angle W', Figures 10 and 11 during each revolution of crank 25. Under these conditions the motor 23 will obviously decrease the tension of spring 18 while the crank 25 of the receiver moves from the position illustrated in Figure 11 to the position illustrated in Figure 9. As the crank 25 of the receiver continues to move from the position illustrated in Figure 9 to the position illustrated in Figure 8, the motor 23 will be energized in both directions and in this electrically opposed condition, the tension of spring 18 will remain unchanged during the period represented by angles V and V', Figures 4 and 8. Then, as the crank 25 continues to revolve, the motor 23 will again decrease the tension of spring 18 while the crank 25 moves from the position illustrated in Figure 8 to the position illustrated in Figure 10. Thus when the pressure in chamber 2 changes from said assumed higher pressure back to zero, the tension of spring 18 will be decreased twice during each revolution of cranks 6 and 25 until the motor 23 has operated sufficiently in a clockwise direction to permit the force created by spring 27 to pull the arm 13 away from the contact screw 15 after the crank 25 reaches the position illustrated in Figure 8, in which case the circuit for energizing the motor 23 in a clockwise direction to permit the force created by spring 27 to pull the arm 13 away from the contact screw 15 after the crank 25 reaches the position illustrated in Figure 8, in which case the circuit for energizing the motor 23 in a clockwise direction and the circuit for energizing said motor in a counter-clockwise direction will be simultaneously closed and simultaneously opened in the manner already described, so that as the cranks 6 and 25 continue to rotate, the motor 23 will be electrically opposed during each revolution of said cranks for the period represented by the two equal angles V and V', Figures 4 and 8, thus preventing any further change in the tension of spring 8.

It is obvious from the above that the driving shaft 22 of the motor 23 will rotate in one direction or the other as required to increase or decrease the tension of spring 18, in proportion to any increase or decrease in the tension of the Bourdon spring 1. Although the reversible motor 23 may be any standard type, I prefer to utilize a reversible synchronous motor of the Warren type which has independent windings for each direction of operation, and the driving shaft 22 of which rotates at about four revolutions per minute. An arm 38, Figure 1, is fastened to said shaft, at the extreme end of which arm is a marker 39 which rests against a clock driven chart 40. As the pressure in chamber 2 increases, the motor 23 will increase the tension of spring 18, in the manner stated and simultaneously move the arm 38 counter-clockwise, and as the pressure in chamber 2 decreases, the motor 23 will decrease the tension of spring 18, in the manner stated, and simultaneously move the arm 38 clockwise, thus causing the marker 39 to make a graphical record on chart 40 of all fluctuations in said pressure.

In the pressure measuring system thus far described it is assumed that the motors 5 and 24 of the transmitter and receiver respectively, are synchronized not only with respect to speed but also with respect to the relative positions of the cranks 6 and 25. As previously stated these cranks must be positioned on their respective shafts so that they will always be parallel as said motors continue to operate. This condition is obviously essential to insure the proper functioning of the system and, as previously stated, can be readily provided by placing the cranks on their respective shafts at the same angle and in a parallel position before the motors are started. If said two continuously operating synchronous motors are then started at the same time, the two cranks will obviously remain parallel as the motors continue to operate. It is conceivable, however, that the transmitter be located at a considerable distance from the receiver. As a matter of fact they may be located many miles apart. When this is the case it would be difficult to make the initial parallel adjustment of the two cranks and means has therefore been provided for making this adjustment at the receiver or recording end of the system without the necessity of observing the crank position at the transmitting end. This is accomplished by permanently fastening the continuously operating motor 24 to a worm wheel 41, Figure 1, through motor extension legs 42, so that the axis of the motor shaft 26 coincides with the axis of said worm wheel. The worm wheel 41 to which the motor 24 is thus fastened is rotatably mounted on a fixed bearing, not shown, and is held in a fixed position by means of a worm 43. The worm 43 is rotatably mounted on a shaft 44 which shaft is held in a fixed bearing 45. This shaft is provided with a knob 46 by means of which the worm 43 may be turned to change the position of the motor in a clockwise or counter-clockwise direction. It is obvious therefore that, while both the motors 5 and 24 are in operation, the knob 46 can be adjusted in one direction or the other as required to synchronize the cranks 6 and 25 with respect to position so that they will remain parallel throughout each revolution of said motors. For reasons already stated, the necessary adjustment of knob 46 may have to be made without observing crank 6 of the transmitter. The manner in which this is accomplished is described as follows:

Let us assume for example that the cranks 6 and 25 are not in a parallel position when the system is first put into operation. If all of the other adjustments have been properly made, in the manner previously stated, then when the pressure in chamber 2 is zero, the period of time during which contact is established between 3 and 9 will, in the manner already stated, be equal to the period of time during which contact is established between 13 and 15, but if the cranks are not parallel when the motors are started, contact between 3 and 9 and between 13 and 15 will not be made and broken simultaneously. In other words even though the cranks 6 and 25 are not parallel, the period of time during which contact is established between 3 and 9 will obviously still be the same as the period of time during which contact is established between 13 and 15 but if the crank 6 is in advance of crank 25, the crank 6 will reach the position illustrated by Figure 5 to establish contact between 3 and 9 before the crank 25 reaches the position illustrated in Figure 9 to establish contact between 13 and 15. Therefore the motor 23 will be energized to increase the tension of spring 18 and simultaneously move the marker 39 counter-clockwise until the crank 25 has sufficiently reduced the tension of spring 27 to permit the spring 18 to establish contact between 13 and 15, at which time the motor 23 will be electrically opposed and the marker 39 will cease to move in said counter-clockwise direction. Said electrically opposed condition of motor 23 will continue, thus preventing further motion of the marker 39, until the crank 6 reaches the position illustrated in Figure 4 after which, in the manner previously stated, contact between 3 and 9 will be broken. Due, however, to the difference in the angular positions of the cranks 6 and 25, the crank 25 will not have turned sufficiently to cause the spring 27 to break contact between 13 and 15. The motor 23 will therefore be energized to decrease the tension of spring 18 and simultaneously move the marker 39 in a clockwise direction until the crank 25 has reached the position in which the spring 27 has again sufficient power to break contact between 13 and 15. It thus follows that when the cranks 6 and 25 are not properly synchronized with respect to position, the marker 39 will continue to move once clockwise and once counter-clockwise during each revolution of the motors 5 and 24, the distance which the marker moves back and forth in said manner depending upon the distance which one crank lags behind the other. Therefore if, for any reason, one crank lags behind the other by a definite amount, the marker 39 will make a record in the form of a wide band as illustrated by the portion C of Figure 12. However, by means of the knob 46 in the manner already stated, any difference in the relative angular positions of cranks 6 and 25 can be readily adjusted to increase or decrease the distance which one crank lags behind the other until the angular positions of both cranks are always identical as the motors 5 and 24 continue to operate. Obviously if the knob 46 is turned in the wrong direction, the distance which the one crank lags behind the other will be increased. This, in the manner stated, will increase the distance through which the marker moves in one direction and then in the other to produce a wider record or band as illustrated by the portion D, Figure 12. Similarly, if the knob 46 is turned in the opposite direction, the distance which the one crank lags behind the other will be decreased. This, in the manner already stated, will decrease the distance through which the marker moves in one direction and then in the other to produce a narrower record or band as illustrated by the portion E, Figure 12. As the adjustment of knob 46 is gradually continued in the proper direction to decrease the distance which one crank lags behind the other, the width of the record line traced by the marker will obviously decrease (portion F, Figure 12) until the cranks are definitely synchronized with respect to position. Thereafter, in the manner previously described, the marker 39 will only move in proportion to changes in the pressure applied to the Bourdon spring and a record of such changes will be accurately recorded on the chart as illustrated in Figure 1 and portion G of Figure 12.

I claim:

1. In receiver apparatus for electrical impulses of variable duration transmitted through an electric circuit connected with said apparatus: the combination with a movably mounted member, a fixed contact member adapted to be engaged by said movable contact member, together with means to apply to the latter a force, and a second electric circuit including said contact members and a source of electricity, together with electrical means included in the said second electric circuit and controlled by the action of said contact members to vary in one sense the force applied to the movable contact member thereof; of electrical means energized by the impulses of variable duration to vary in the opposite sense the force applied to said movable contact member, additional means to apply to the latter member a force, and electrically operated means acting on said additional means for cyclically varying the magnitude of the force applied thereby.

2. In receiver apparatus for electrical impulses of variable duration transmitted through an electric circuit connected with said apparatus: the combination with a movably mounted contact member, a fixed contact member adapted to be engaged by said movable contact member, together with means to apply to the latter a force tending to effect engagement between said members, and an electric circuit including said contact members and a source of electricity, together with electrical means included in the said contact electric circuit and controlled by the action of said contact members to decrease the force applied to the movable contact member thereof; of electrical means energized by the impulses of variable duration to increase the force applied to said movable contact member, additional means to apply to the latter member a force tending to disengage said contact member, and electrically operated means acting on said additional means for cyclically varying the magnitude of the force applied thereby.

3. In receiver apparatus for electrical impulses of variable duration transmitted through an electric circuit connected with said apparatus: the combination with a movably mounted contact member, a fixed contact member adapted to be engaged by said movable contact member, together with means to apply to the latter a force, and a second electric circuit including said contact members and a source of electricity, together with electrical means included in the said second electric circuit and controlled by the action of said contact members to vary in one sense the force applied to the movable contact member thereof; of electrical means energized by the impulses of variable duration to vary in the opposite sense the force applied to said movable contact member, additional means to apply to the latter member a second force, and electrically operated means acting on said additional means for cyclically varying the magnitude of the second force between fixed high and low limits.

4. Receiver apparatus according to claim 1 characterized by the movable contact member being in the form of a bellcrank, one arm of which is adapted to contact the fixed contact member and the other arm of which has attached thereto one end of a spring element, together with a member connected to the other end of said spring element and actuated by the contact-controlled electrical means in one sense and in the opposite sense by the electrical means energized by the impulses.

5. Receiver apparatus according to claim 3 characterized by the provision of means to adjust the time of application of the fixed high and low limits of the cyclically variable force applied to the movable contact member.

6. Receiver apparatus according to claim 1 in which the additional means for applying a force to the movable contact member includes a tension spring, one end of which is attached to the movable member and the other end to the electrically operated means for cyclically varying the tension of the spring.

7. Receiver apparatus according to claim 1 in which the electrically operated means is constituted as a crank rotated at a constant speed.

8. In a receiver apparatus for electric impulses of variable duration transmitted in continuous cycles through an electric circuit connected with said apparatus, the combination with a movably mounted contact member, of a fixed contact member adapted to be engaged by said movable contact member, together with means to apply to the latter a force tending to effect engagement between said contacts, an indicating arm for measuring the lengths of said impulses together with electrical means energized by the impulses of variable duration for moving the arm in one direction and simultaneously acting on said force applying means to increase the magnitude of the force, a second circuit including said contact members and a source of electricity, together with electrical means included in said second circuit and controlled by the action of said contact members to move the indicating arm in the opposite direction and simultaneously acting on said force applying means to decrease the magnitude of the force, additional means to apply to the movable contact member a second force tending to disengage said contact members, and electrically operated means acting on said additional means for cyclically varying, synchronously with said continuous impulse, the magnitude of the force applied thereby.

9. A system for transmitting variable conditions as measured by a variable force, comprising transmitter means to transmit during recurring cycles of like periods electrical impulses of variable duration dependent on the magnitude of the measured force, and receiver means electrically connected therewith and comprising a movably mounted contact member, a fixed contact member adapted to be engaged by said movable contact member, together with means to apply to the latter a force, and an electric circuit including said contact members and a source of electricity, together with electrical means included in the said contact electric circuit and controlled by the action of said contact members to vary in one sense the force applied to the movable contact member thereof, and electrical means energized by the impulses of variable duration to vary in the opposite sense the force applied to said movable contact member, additional means to apply to the latter member a force, and electrically operated means acting on said additional means for cyclically varying, synchronously with said recurring cycles, the magnitude of the force applied thereby.

FRITZ FREDERICK UEHLING.